(12) United States Patent
Marmaropoulos et al.

(10) Patent No.: US 10,461,306 B2
(45) Date of Patent: Oct. 29, 2019

(54) BATTERY AND METHOD OF ATTACHING SAME TO A GARMENT

(75) Inventors: George Marmaropoulos, Yorktown Heights, NY (US); Giang Vu, Peekskill, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2452 days.

(21) Appl. No.: 11/994,182

(22) PCT Filed: Jun. 20, 2006

(86) PCT No.: PCT/IB2006/051982
§ 371 (c)(1),
(2), (4) Date: Dec. 28, 2007

(87) PCT Pub. No.: WO2007/004087
PCT Pub. Date: Jan. 11, 2007

(65) Prior Publication Data
US 2008/0220293 A1 Sep. 11, 2008

Related U.S. Application Data

(60) Provisional application No. 60/695,660, filed on Jun. 30, 2005.

(51) Int. Cl.
*H01M 2/20* (2006.01)
*H01M 2/34* (2006.01)
(Continued)

(52) U.S. Cl.
CPC ......... *H01M 2/342* (2013.01); *H01M 2/0207* (2013.01); *H01M 2/20* (2013.01);
(Continued)

(58) Field of Classification Search
CPC .... H01M 2/02; H01M 2/0202; H01M 2/0207; H01M 2/02212; H01M 2/0212; H01M 2/342; H01M 2/20; H01M 6/46; H01R 13/6205; Y10T 24/32; A41D 1/002; A41D 1/00
USPC .................................................. 429/121, 162
See application file for complete search history.

(56) References Cited

U.S. PATENT DOCUMENTS 4,037,022 A 7/1977 Cheron
4,427,481 A 1/1984 Smith
(Continued)

FOREIGN PATENT DOCUMENTS

JP 04329260 11/1992
WO 9629749 A1 9/1996
(Continued)

*Primary Examiner* — Stephen J Yanchuk

(57) ABSTRACT

A thin battery (100) has a central portion (110) and two end portions (120). One of the two end portions includes a positive voltage connection (121) exposed on both the top and bottom surfaces of the battery. The other one of the two end portions includes a negative voltage connection (122) exposed on both the top and bottom surfaces of the battery. Each of the end portions (120) includes a magnetic element having a north magnetic pole on one of the top or bottom surface of the battery and a south magnetic pole on the other one of the top or bottom surface of the battery. Multiple batteries may be connected to each other through magnetic attraction. The battery may be securely attached and electrically connected to a garment (1000) using positive and negative conductive surfaces/contacts (1010, 1020) on a fiber layer of the garment and a corresponding magnetic element (1050) beneath the conductive surfaces/contacts that attracts and secures the battery in place.

14 Claims, 5 Drawing Sheets

(51) Int. Cl.
*H01M 2/02* (2006.01)
*H01R 13/62* (2006.01)
*H01M 6/46* (2006.01)
*A41D 1/00* (2018.01)

(52) U.S. Cl.
CPC ............... *A41D 1/002* (2013.01); *H01M 2/02* (2013.01); *H01M 2/0212* (2013.01); *H01M 2/202* (2013.01); *H01M 6/46* (2013.01); *H01R 13/6205* (2013.01); *Y10T 24/32* (2015.01)

(56) References Cited

U.S. PATENT DOCUMENTS

| | | | |
|---|---|---|---|
| 4,584,571 A | | 4/1986 | Smit |
| 4,917,612 A | | 4/1990 | Priest |
| 5,109,322 A | | 4/1992 | Loughlin |
| 5,203,709 A | | 4/1993 | Huang |
| 5,277,993 A | | 1/1994 | Landers |
| 5,531,601 A | | 7/1996 | Amoroso |
| 5,763,112 A | * | 6/1998 | Redford ..................... 429/1 |
| 6,815,061 B2 | | 11/2004 | Van Heerden |
| 2004/0016455 A1 | * | 1/2004 | Oogami ..................... 136/244 |
| 2005/0229690 A1 | * | 10/2005 | Kikuchi ................. B60C 19/00 73/146 |
| 2005/0239261 A1 | * | 10/2005 | Tai ..................... H01R 13/6205 438/380 |

FOREIGN PATENT DOCUMENTS

| | | |
|---|---|---|
| WO | 0195752 A1 | 12/2001 |
| WO | 03090321 A1 | 10/2003 |

\* cited by examiner

BATTERY AND METHOD OF ATTACHING SAME TO A GARMENT

The present invention relates generally to wearable electronics. Particularly, the present invention relates to a battery and a method of attaching a battery to a garment.

Batteries can be made in various forms, voltages and current capacities. For example, handheld electronic devices that are preferably small in size, such as an electronic shaver or portable music player, may utilize a thin or relatively small sized custom battery. But custom batteries have the disadvantages that they can generally only be used in the same type of device for which they are designed and also require custom connections between the battery and the device.

Standard batteries, such as a common "AA" alkaline battery has a predetermined size and cylindrical shape, and a predetermined voltage of 1.5 volts. Quite commonly, standard batteries need to be connected in series to provide the voltage needed by a particular electronic device. For example, three batteries may be connected in series to provide 4.5 volts. Similarly, the batteries may be connected in parallel to provide increased current.

For standard batteries, a battery compartment may be used that holds the batteries in place and provides one or more connections between the batteries and an electronic device. However, such battery compartments add components and increases the volume of the device.

Battery compartments are not well suited for wearable electronics because they add components and bulges. Bulky electronics may be undesirable from a fashion standpoint or lead to uncomfortable results to the wearer of the article of clothing. Attaching bulky electronics to the inside of a jacket or shirt can cause discomfort, cuts, burns, bruises and related injury to the wearer. Furthermore, there also exist problems associated with the decreased flexibility of the article of clothing that has a bulky object disposed therein. Generally, the comfort, flexibility and fit of a garment decreases dramatically whenever a user adds bulky, heavy or inflexible electronics.

Additionally, attaching a battery for wearable electronics onto a garment is difficult since the battery needs frequent repeated attachment and removal such as for washing the garment and needs to be connected to the electronics in a fast, intuitive and secure way. There also are operational difficulties with regard to the electrical connection between a battery and an electronic device or circuit integrated in an article of clothing. Given the wide range of activities that the wearer may engage in, either rain or perspiration may penetrate or otherwise enter the electrical connection. Fluid, perspiration and moisture may disrupt the operation of the wearable electronics. Additionally, protection of the wearer of the garment from mild electrical shocks or other detrimental attributes of an electronic device is a concern.

A need therefore exists for a battery that is suitable for wearable electronics and for a method of securely attaching the battery to an article of clothing. A need also exists for a battery system that allows the intuitive and easy connection of batteries either in series or parallel without the need for a specially designed battery compartment.

It is an aim of the invention to address and resolve the aforesaid needs. The preferred embodiments provide a system and method for attaching a battery or a set of batteries onto a garment in a way that satisfies the above mentioned requirements.

A thin battery is provided with end portions which are magnetic and include voltage connections. The magnetic end portions allow the fast and intuitive connection of a number of such batteries either in parallel or in series. For wearable electronic applications, the battery or set of batteries can be securely attached onto a garment utilizing the magnetic end portions.

The foregoing and still other objects and advantages of the present invention will be more apparent from the following detailed explanation of the preferred embodiments in connection with the accompanying drawings.

The accompanying drawings, in which like reference characters denote like elements, show exemplary aspects of the preferred embodiments of the invention. Such aspects are shown by way of example rather than limitation.

Figure 1:
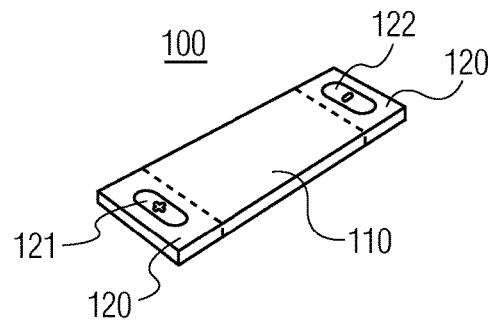
FIG. 1 is a perspective view of a battery according to a preferred embodiment of the invention.
Figure 2:
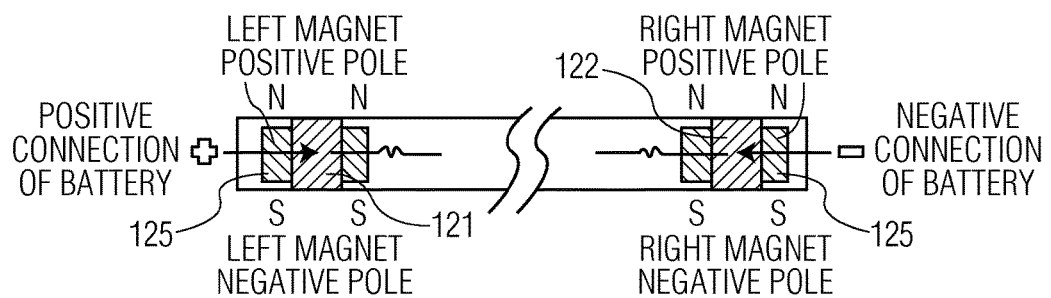
FIG. 2 is a diagrammatic cross section view of the battery shown in FIG. 1.
Figure 3:
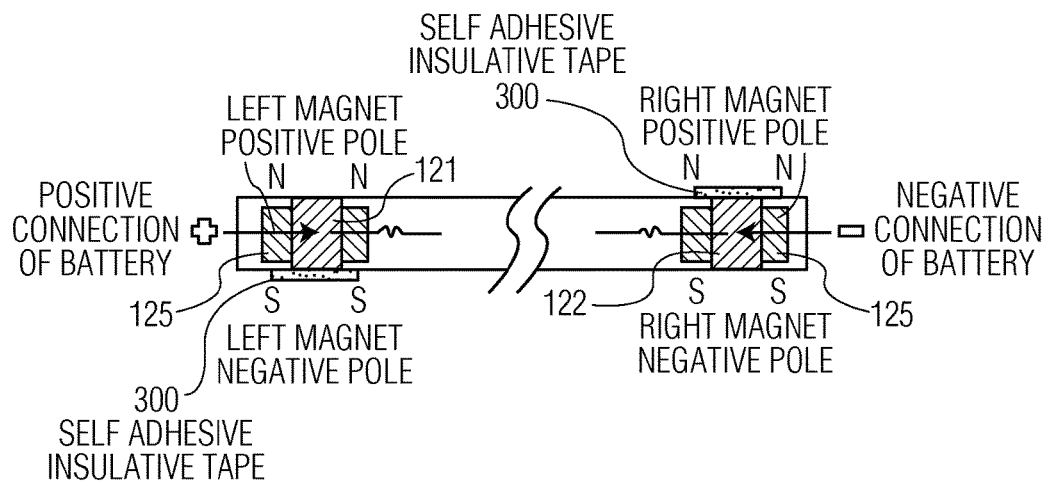
FIG. 3 is a diagrammatic cross section view of the battery shown in FIG. 1 having self adhesive insulating tape.

Referring to the FIGS. and, in particular, to FIGS. 1-3, there is illustrated a perspective view of a battery 100 according to a preferred embodiment of the present invention. Battery 100 is relatively thin, the width and length of battery 100 being many times that of the thickness of battery 100. As shown in FIG. 1, the battery may be in the shape and form of a thin strip of constant thickness. Alternatively, battery 100 may have rounded ends, tapered edges, or varying thickness. See, for example, the battery shown in FIGS. 9 and 10. Preferably, the battery is not completely rigid and has some flexibility at least in the longitudinal direction.

Battery 100 has a central portion 110 and two end portions 120. The end portions may span the entire width of battery 100, as shown in FIG. 1, or may be only a portion of the width. One end portion 120 includes the positive connection 121 of the battery and the other end portion 120 includes the negative connection 122 of the battery. Although not shown in FIGS. 1 and 2, the positive connection 121 and negative connection 122 may protrude slightly from the top and bottom surfaces of end portions 120.

Each end portion 120 includes some magnetic element imparting a magnetic effect. The magnetic elements may be in the form of particles dispersed throughout the material comprising end portions 120 so that the end portions have a cumulative magnetic effect. Alternatively, the magnetic elements may be discrete thin magnets 125 included within encasing material 123 and beneath the surface of end portions 120 as shown in FIGS. 2 and 3. The encasing material 123 of the end portions 120 may or may not be the same material utilized in central portion 110.

In the case of discrete magnets 125, both poles are preferably present on the two opposing top and bottom surfaces of battery 100. The positive north ("N") pole of each magnet 125 may be on the top of end portions 120 while the negative south ("S") pole is on the bottom of end portions 120, as shown in FIGS. 2 and 3, or the positive north ("N") pole of magnet 125 of one end portion 120 may be on the top while the positive north ("N") pole of magnet 125 of the other end portion is on the bottom. The magnets can be used as described below for providing strong and intuitive connection between batteries as desired.

As shown in FIG. 3, battery 100 may further have a self-adhesive insulative tape 300 covering the top surface of negative connection 122 and the bottom surface of positive connection 121. The self-adhesive insulative tape 300 is sufficient to prevent an electrical connection from being formed but do not cancel the magnetic effect of the north ("N") pole on the top surface of negative voltage connection 122 or the south ("S") pole on the bottom surface of the positive voltage connection 121.

Figure 4:
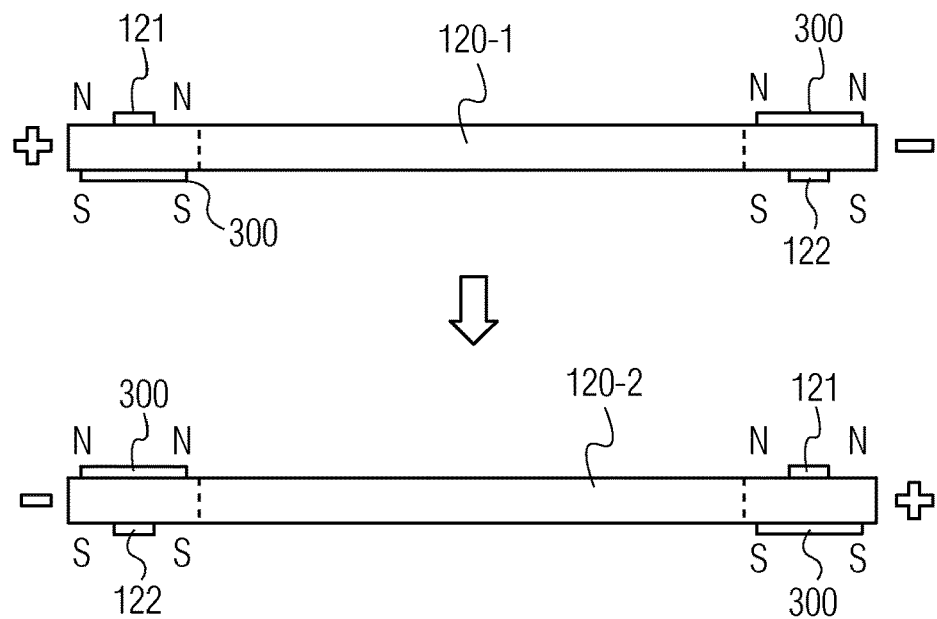
FIG. 4 is an illustrative side view of a connection of two of the batteries shown in FIG. 3 in series according to a first exemplary arrangement.
Figure 5:
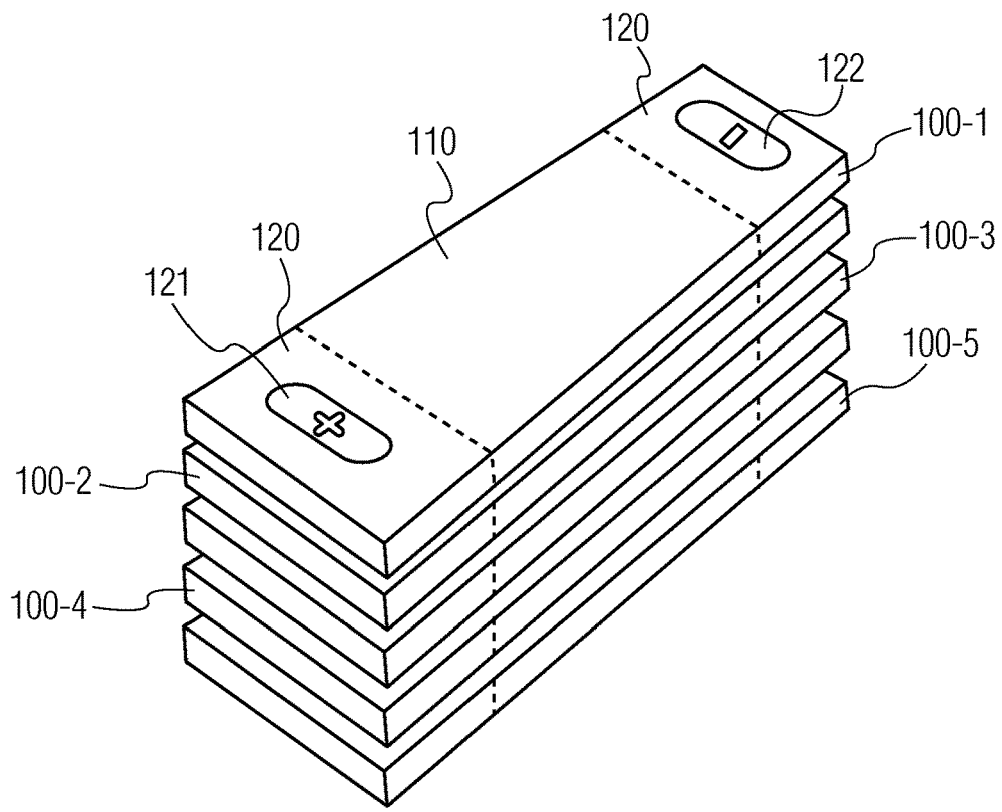
FIG. 5 is a perspective view of the connection of several batteries in series according to the first exemplary arrangement.

FIG. 4 shows the connection of two batteries 100 shown in FIG. 3 in series in a first possible arrangement in order to double the voltage of a single battery. One battery 100-2 is turned upside down so that the north ("N") pole of the negative voltage connection is below and attracted to the south ("S") pole of the positive voltage connection of battery 100-1. However, the self-adhesive insulative tape on the top surface of the negative voltage connection 122 of battery 100-2 and on the bottom surface of the positive voltage connection 121 of battery 100-1 prevents a electrical connection between those voltage connections, while the magnets of the end portions 120 are still attracted to each other. The north ("N") pole of the positive voltage connection of battery 100-2 and the south ("S") pole of the negative voltage connection of battery 100-1 are vertically adjacent and also attracted to each other. However, there is no self-adhesive insulative tape between those voltage connection so the batteries become connected in series and the resulting voltage is double that of a single battery. FIG. 5 is a perspective showing five batteries 100-1 through 100-5 vertically stacked and connected in series in this manner by turning each alternate battery upside down to create a resulting voltage which is five times the voltage of a single battery.

Figure 6:
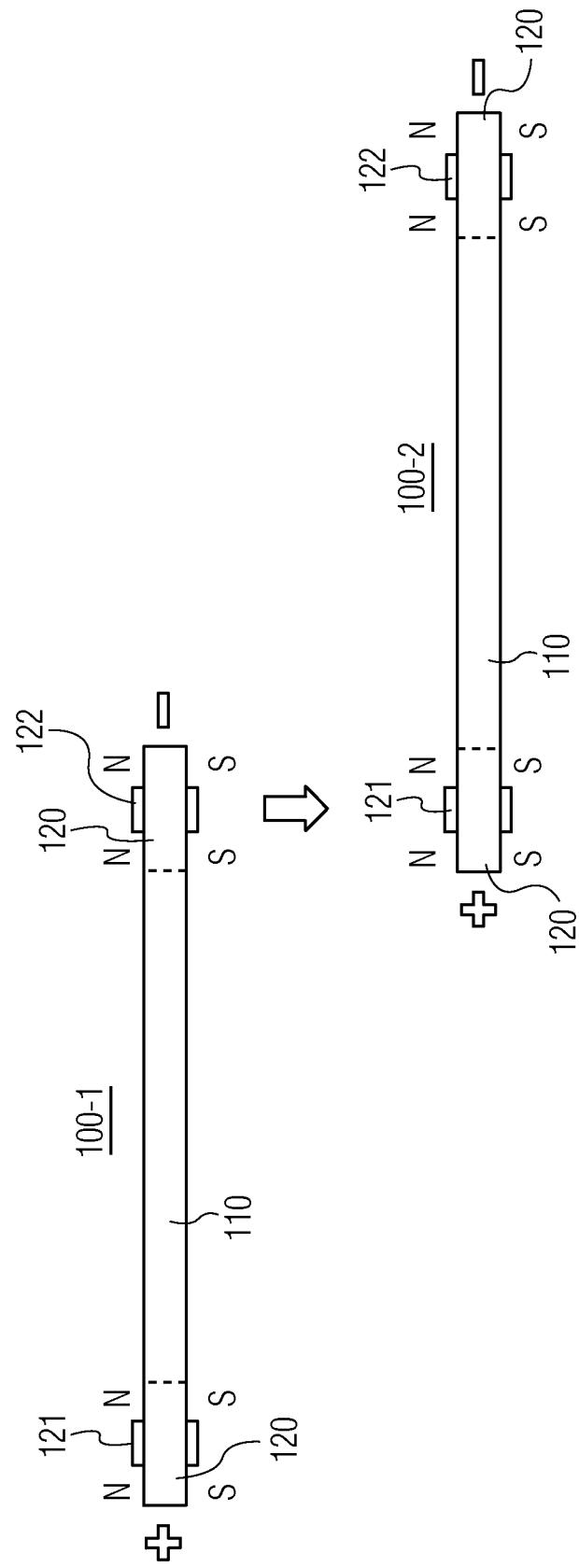
FIG. 6 is an illustrative side view of a connection of two of the batteries shown in FIGS. 1 and 2 according to a second exemplary arrangement.
Figure 7:
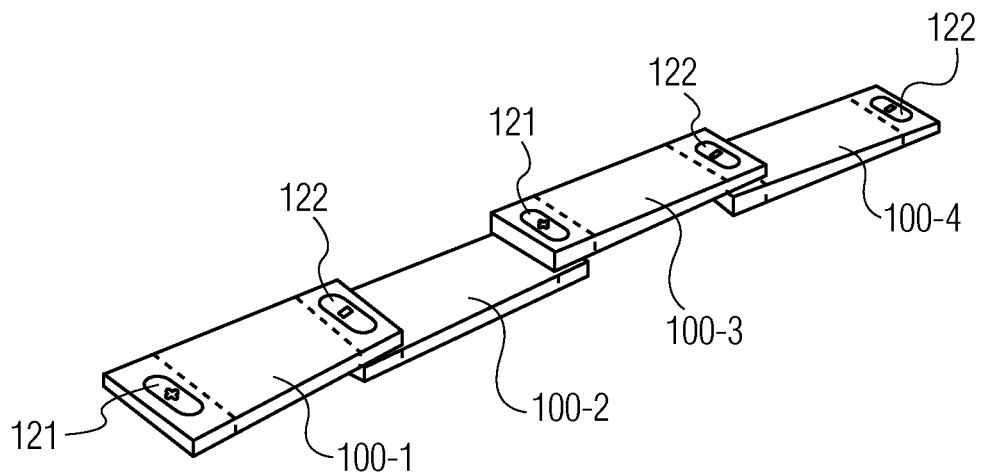
FIG. 7 is a perspective view showing a connection of several batteries in series according to the second exemplary arrangement.

FIG. 6 shows the connection of two batteries 100 without self-adhesive insulative tape in an alternate second arrangement to provide a voltage that is double the voltage of a single battery. In this case, the negative voltage connection 122 of battery 100-1 is placed above the positive voltage connection 121 of battery 100-2 and connected due to the magnetic effect of the end portions 120. However, the negative voltage connection 122 of battery 100-2 is not vertically adjacent to the positive voltage connection 121 of battery 100-1. The resulting voltage differential between positive voltage connection 121 of battery 100-1 and negative voltage connection 122 of battery 100-2 will be twice that of a single battery. FIG. 7 shows such a connection of four batteries 100-1 to 100-4 according to this second arrangement to provide a voltage that is four times the voltage of a single battery.

Figure 8:
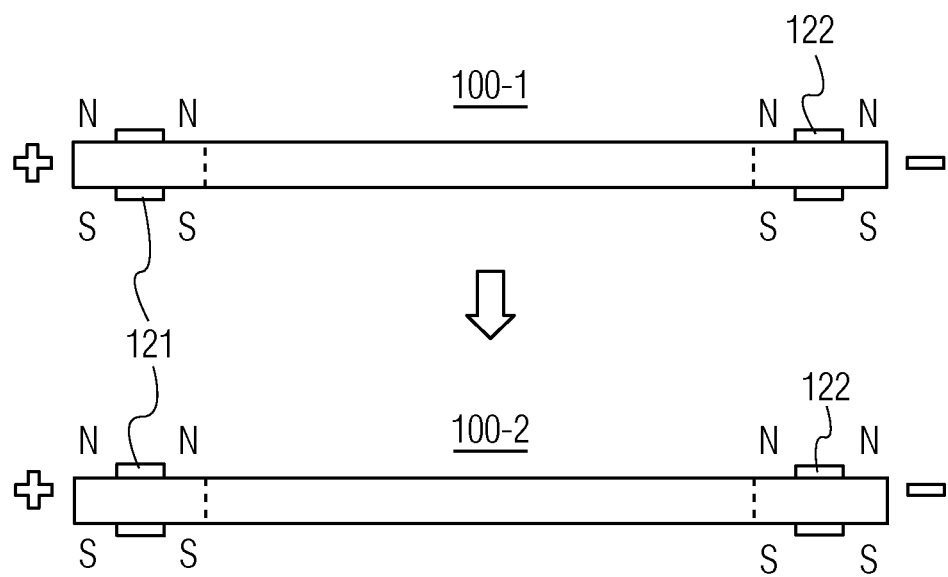
FIG. 8 is an illustrative side view of a connection of two batteries in parallel according to a third exemplary arrangement.

In certain applications where more current is required, such as where the electronics include a radio transmitter, it may be desirable to connect the batteries in parallel. In such an instance, two or more batteries 100 can be vertically stacked in a third arrangement shown in FIG. 8. Without turning over any battery and keeping the same vertical orientation, the batteries will naturally be connected in parallel. Of course, if any battery has self-adhesive tape 300 covering one side of its voltage connections, the tape should be remove to permit the parallel connection.

Figure 9:
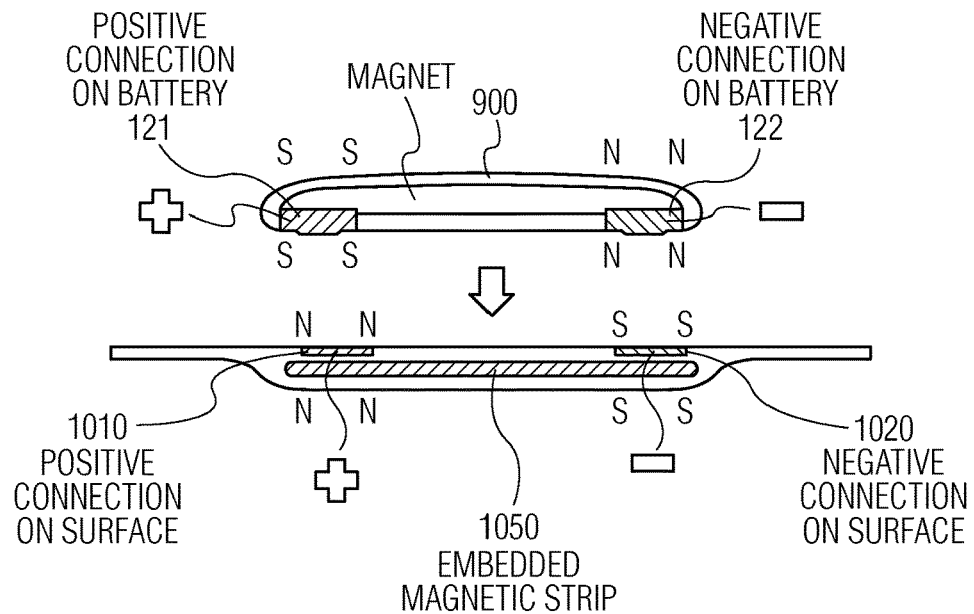
FIG. 9 is a diagrammatic cross section view of the exemplary attachment of a battery onto part of a garment shown in FIG. 10.
Figure 10:
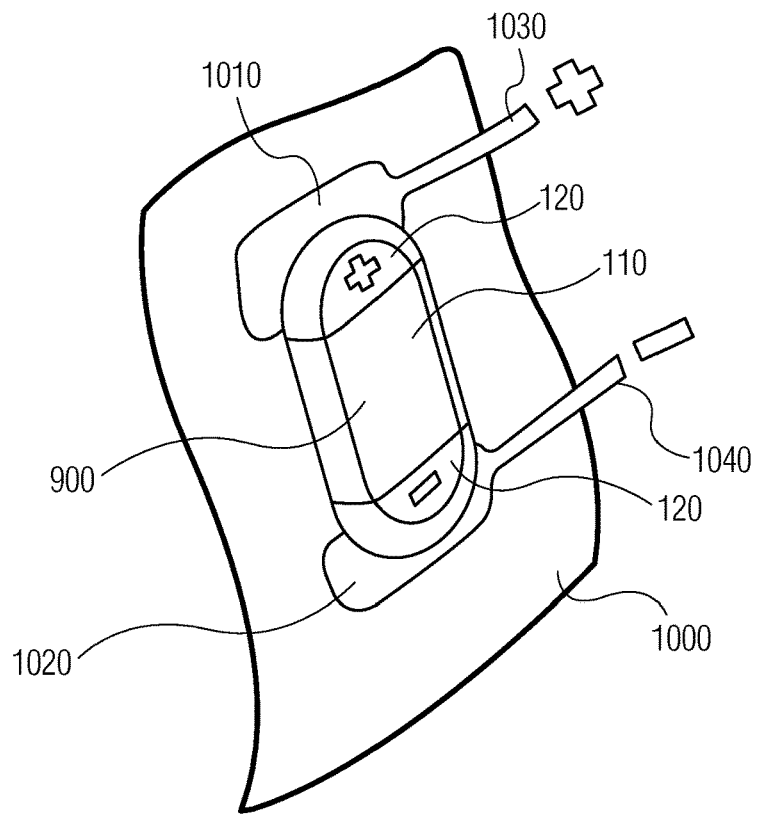
FIG. 10 is a perspective view showing an exemplary attachment of a battery onto part of a garment.

For wearable electronic applications, a battery or the set of batteries should be able to be securely attached onto a garment. Referring to FIGS. 9 and 10, there is illustrated a method of attaching a battery according to an embodiment of the present invention. The battery may be a battery according to the preferred embodiment shown in FIGS. 1-3 and discussed above, or the battery may be any other battery having a magnetic effect at end portions including the voltage connections of the battery. A further example is the battery 900 shown in FIGS. 9 and 10, wherein there is a single magnet having its north ("N") magnetic pole at the end portion including negative voltage connection 122 and its south ("S") magnetic pole at the end portion including the positive voltage connection 121.

On the surface of a portion of the garment fabric 1000, there are two conductive fiber surfaces/contacts 1010 and 1020 connected to respective conductive fiber tracks 1030 and 1040 embedded into the garment and leading to a wearable electronic device. Although not shown in the figures, the garment may have several layers of fabric, and the conductive surfaces/contacts 1010 and 1020 may be on the top fabric layer or any other fabric layer of the garment. The conductive fibers may be implemented in any of the ways described in U.S. Pat. No. 6,815,061, which patent is hereby incorporated by reference in its entirety.

In any case, underneath the conductive surfaces/contacts 1010 and 1020 of the garment, there is a corresponding magnetic strip 1050. The polarity of the magnetic strip 1050 is such that it attracts the corresponding magnetic poles at the end portions of the battery such as battery 900. Although a magnetic strip 1050 is shown in FIG. 9, there may alternatively be two discrete magnets each under one of the conductive surfaces/contacts 1010 and 1020 and having similar magnetic effects. The specific orientation of the magnetic poles in the battery and garment is not significant so long as it provides for a magnetic attraction between the end portion of the battery having the positive voltage connection and the positive conductive surface/contact 1010 and between the end portion of the battery having the negative voltage connection and the negative conductive surface/contact 1020.

The arrangement allows for the secure and easy attachment of a battery onto the garment. The battery can also be easily removed from the garment for washing or replacement, for example. The attachment of the battery will necessarily be secure and correct since the magnetic poles will repel each other if the battery is placed with the proper orientation. Of course, the battery and/or conductive fiber surfaces/contacts can be marked with "(+)" and "(−)" symbols to suggest proper placement of the battery.

The present invention has been described with particular reference to certain preferred embodiments. It should be understood that the foregoing description and examples are only illustrative of the present invention. Various alternatives and modifications thereof can be devised by those skilled in the art without departing from the spirit and scope of the present invention. Accordingly, the present invention is intended to embrace all such alternatives, modifications, and variations that fall within the scope of the appended claims.

The invention claimed is:

1. A battery comprising:
a source of voltage;
at least one positive voltage connection on the source of voltage;
at least one negative voltage connection on the source of voltage;
a first magnetic element that is collocated with the at least one positive voltage connection; and
a second magnetic element that is collocated with the at least one negative voltage connection; wherein the battery comprises a first surface and a second surface that is opposite the first surface;
wherein the at least one positive voltage connection comprises a first positive voltage connection on the first surface and a second positive voltage connection on the second surface;
wherein the at least one negative voltage connection comprises a first negative voltage connection on the first surface and a second negative voltage connection on the second surface; and
wherein the first and second magnetic elements have an "N" pole on the first surface and an "S" pole on the second surface.

2. The battery of claim 1, further comprising at least one removable non-conductive adhesive strip adhered to at least one of the at least one positive voltage connection and the at least one negative voltage connection.

3. The battery of claim 1, wherein the at least one positive voltage connection is situated at a first extremity of the battery, and the at least one negative voltage connection is situated at a second extremity of the battery, opposite the first extremity.

4. The battery of claim 1, wherein the battery has a length, a width, and a thickness, and wherein the length and width are many times the thickness of the battery.

5. The battery of claim 4, wherein the battery has flexibility at least along the length of the battery.

6. The battery of claim 1, wherein the first and second magnetic elements comprise magnetic material embedded in the battery.

7. A modular battery system comprising a plurality of battery elements,
wherein each battery element comprises:
a source of voltage;
at least one positive voltage connection to the source of voltage;
at least one negative voltage connection to the source of voltage;
a first magnetic element that is collocated with the at least one positive voltage connection; and
a second magnetic element that is collocated with the at least one negative voltage connection;
wherein each battery element comprises a first surface and a second surface that is opposite the first surface;
wherein the at least one positive voltage connection of each battery element comprises a first positive voltage connection on the first surface and a second positive voltage connection on the second surface;
wherein the at least one negative voltage connection of each battery element comprises a first negative voltage connection on the first surface and a second negative voltage connection on the second surface;
wherein the first and second magnetic elements of each battery element have an "N" pole on the first surface and an "S" pole on the second surface; and
wherein the first and second magnetic elements of each battery element provide direct physical and electrical coupling of the battery element to an immediately adjacent battery element of the plurality of battery elements.

8. The system of claim 7,
wherein each of the bodies of the battery elements include a length, a width, and a thickness,
wherein the length and width are many times the thickness of the battery, and
wherein the plurality of battery elements comprises a stack of the battery elements in a direction of the thickness.

9. The system of claim 8,
wherein a first orientation of each battery element with respect to its immediately adjacent battery element forms a series connection, and
wherein a second orientation of each battery element with respect to its immediately adjacent battery element forms a parallel connection.

10. The system of claim 7,
wherein a first orientation of each battery element with respect to its immediately adjacent battery element forms a series connection, and
wherein a second orientation of each battery element with respect to its immediately adjacent battery element forms a parallel connection.

11. The system of claim 7, wherein each battery element is in the form of a thin strip of constant thickness.

12. The system of claim 7, wherein each of the first and second magnetic elements comprises dispersed magnetic particles.

13. The system of claim 7, wherein each of the first and second magnetic elements comprises a discrete magnet.

14. The system of claim 7, wherein each battery element includes a removable insulative adhesive covering a first surface of the negative voltage connection and a removable insulative adhesive covering an opposite surface of the positive voltage connection.

* * * * *